United States Patent
Suwa et al.

(10) Patent No.: US 11,578,784 B2
(45) Date of Patent: Feb. 14, 2023

(54) REDUCTION GEAR AND GEARED MOTOR

(71) Applicant: MABUCHI MOTOR CO., LTD., Matsudo (JP)

(72) Inventors: Masakazu Suwa, Matsudo (JP); Takao Mitsumizo, Matsudo (JP)

(73) Assignee: MABUCHI MOTOR CO., LTD., Matsudo (JP)

( * ) Notice: Subject to any disclaimer, the term of this patent is extended or adjusted under 35 U.S.C. 154(b) by 234 days.

(21) Appl. No.: 17/157,012

(22) Filed: Jan. 25, 2021

(65) Prior Publication Data
US 2021/0239187 A1 Aug. 5, 2021

(30) Foreign Application Priority Data

Jan. 31, 2020 (JP) .............................. JP2020-014719

(51) Int. Cl.
*F16H 1/32* (2006.01)
*F16H 57/031* (2012.01)
*F16H 57/02* (2012.01)

(52) U.S. Cl.
CPC .............. *F16H 1/32* (2013.01); *F16H 57/031* (2013.01); *F16H 2001/327* (2013.01); *F16H 2057/02034* (2013.01); *F16H 2200/2007* (2013.01)

(58) Field of Classification Search
CPC .... F16H 1/32; F16H 57/031; F16H 2001/327; F16H 2057/02034; F16H 2200/2007
See application file for complete search history.

(56) References Cited

U.S. PATENT DOCUMENTS

| 2013/0252781 A1 | 9/2013 | Hagedorn |
| 2018/0051775 A1* | 2/2018 | Liang ........................ F16H 1/46 |
| 2018/0283508 A1* | 10/2018 | Aoki ........................ B25F 5/02 |

FOREIGN PATENT DOCUMENTS

| DE | 20 2007 003 419 U1 | 5/2007 |
| JP | 2003-222201 A | 8/2003 |

OTHER PUBLICATIONS

Office Action with Citation of publications under consideration issued by the German Patent and Trademark Office for corresponding German Patent Application No. 10 2021 101 970.2, dated Apr. 1, 2022, with an English machine translation.

Renius, Karl Theodor, "Traktoren—Technik und ihre Anwendung", BLV Verlagsgesellschaft mbH, 1985, pp. 120-121, with an English machine translation.

(Continued)

*Primary Examiner* — Colby M Hansen
(74) *Attorney, Agent, or Firm* — Myers Wolin, LLC

(57) ABSTRACT

A reduction gear configured to decelerate and output rotation of a motor includes two-stage planetary gear mechanisms that are provided side by side in an axial direction of the motor and are each configured of helical gears, and a case made of resin and formed into a cylindrical shape, the case incorporating the two-stage planetary gear mechanisms. At least one of an inner engagement ratio of a sun gear and a pinion gear of the planetary gear mechanism in a first stage and an outer engagement ratio of the pinion gear and a ring gear of the planetary gear mechanism in the first stage is 3.0 or more, and both the inner engagement ratio and the outer engagement ratio are larger than an engagement ratio of the planetary gear mechanism in a second stage.

13 Claims, 3 Drawing Sheets

(56) References Cited

OTHER PUBLICATIONS

Office Action issued by the German Patent and Trademark Office for corresponding German Patent Application No. 10 2021 101 970.2, dated Sep. 30, 2022, with an English translation.
Niemann et al. "Machine elements", vol. II., 2 Edition, Berlin: Springer-Verlag, 1983, pp. 271-272, with an English machine translation.

* cited by examiner

REDUCTION GEAR AND GEARED MOTOR

CROSS-REFERENCE TO THE RELATED APPLICATION

This application claims priority under 35 U.S.C. 119 from Japanese Patent Application No. 2020-014719, filed on Jan. 31, 2020, the contents of which are incorporated by reference herein.

BACKGROUND

Technical Field

The present disclosure relates to a reduction gear using two-stage planetary gear mechanisms and a geared motor including the reduction gear.

Related Art

Conventionally, as a power source for an electric gate (e.g., a power lift gate) of a vehicle, a motor with a reduction gear (geared motor) that decelerates and transmits rotation of the motor has been put into practical use. One of these geared motors is mounted inside a cylinder of a damper for supporting a gate, and is provided with a reduction gear using a planetary gear mechanism in which a motor shaft and an output shaft are coaxial. Further, since the geared motor is used to electrically open and close the gate, relatively large torque is required.

As such a reduction gear, it is conceivable to apply, for example, a small reduction gear used for an actuator of an industrial robot or the like, as disclosed in Japanese Patent Application Laid-Open No. 2003-222201. In a reduction gear of Japanese Patent Application Laid-Open No. 2003-222201, it is described that in a planetary gear mechanism in which modules of respective gears are set within a range of 0.3 to 1.0 and a ring gear is formed with the number of teeth set to 72 or less, a total engagement ratio in engagement between a sun gear and a planetary gear is set within a range of 2.0 to 3.5.

SUMMARY

However, according to Table 1 of Japanese Patent Application Laid-Open No. 2003-222201, only the one in which the engagement ratio is set to 2.3 to 2.8 is illustrated, and a configuration in which the engagement ratio is set to 3.0 or more is not described. Further, Japanese Patent Application Laid-Open No. 2003-222201 does not have a basis for setting an upper limit value of a range of the engagement ratio to 3.5.

In general, as the engagement ratio of the gears increases, strength of the gears tends to decrease, and it is important how these two contradictory parameters (engagement ratio and strength) are set in gear design. In Japanese Patent Application Laid-Open No. 2003-222201, in a planetary gear reduction gear having a one-stage planetary gear mechanism, a configuration for setting the modules, the number of teeth of the ring gear, and the engagement ratio is described as described above, and it is described that the configuration is also applicable to a planetary gear reduction gear having planetary gear mechanisms in a plurality of stages. However, in the reduction gear in which motor output is decelerated by the planetary gear mechanisms in the plurality of stages, a magnitude of torque acting on the planetary gear mechanism on a high speed side and the planetary gear mechanism on a low speed side are different, so that the strength of the gears may not be secured if these two planetary gear mechanisms are designed in the same manner.

The reduction gear of the present disclosure has been devised in light of such problems, and one object of the present disclosure is to reduce mechanical noise while securing strength of gears in a reduction gear including two-stage planetary gear mechanisms. In addition, one object of a geared motor of the present disclosure is to improve quietness without increasing a size by including the reduction gear of the present disclosure. Note that the present disclosure is not limited to these objects, but another object thereof is to exert actions and effects that are derived by each configuration described in DETAILED DESCRIPTION described later and that cannot be obtained by the conventional technique.

(1) A reduction gear disclosed herein is a reduction gear configured to decelerate and output rotation of a motor, the reduction gear including: two-stage planetary gear mechanisms that are provided side by side in an axial direction of the motor and are each configured of helical gears; and a case made of resin and formed into a cylindrical shape, the case incorporating the two-stage planetary gear mechanisms, wherein at least one of an inner engagement ratio of a sun gear and a pinion gear of the planetary gear mechanism in a first stage and an outer engagement ratio of the pinion gear and a ring gear of the planetary gear mechanism in the first stage is 3.0 or more, and both the inner engagement ratio and the outer engagement ratio are larger than an engagement ratio of the planetary gear mechanism in a second stage.

(2) It is preferable that both the inner engagement ratio and the outer engagement ratio are 3.0 or more.

(3) It is preferable that a torsion angle of the ring gear of the planetary gear mechanism in the first stage is larger than a torsion angle of a ring gear of the planetary gear mechanism in the second stage.

(4) It is preferable that the case has a bottomed cylindrical shape having a bottom portion at one axial end and a lid portion at another axial end, and is attached to the motor in a direction in which the bottom portion is located on a motor side.

(5) It is preferable that the lid portion is press-fitted into an opening at the other axial end of the case.

(6) A geared motor disclosed herein includes: the reduction gear according to any one of (1) to (5) described above; and the motor having a shaft integrally rotating with the sun gear of the planetary gear mechanism in the first stage of the reduction gear.

According to the disclosed reduction gear, by setting at least one of the inner engagement ratio and the outer engagement ratio of the planetary gear mechanism in the first stage rotating at high speed to 3.0 or more, the gears can be made quiet, and the mechanical noise of the reduction gear can be reduced. The strength of the gears can be increased by making the engagement ratio of the planetary gear mechanism in the second stage, to which large torque is input, lower than the engagement ratio of the planetary gear mechanism in the first stage. Therefore, the mechanical noise of the reduction gear can be reduced while securing the strength of the gears.

Further, according to the geared motor including the disclosed reduction gear, quietness can be improved without increasing the size.

DETAILED DESCRIPTION

A reduction gear and a geared motor as an embodiment will be described with reference to the drawings. The following embodiment is illustrative only and is not intended to preclude application of various modifications and techniques that are not expressly described in the following embodiments. Each of the configurations of the present embodiment can be variously modified without departing from the gist thereof. In addition, selection can be made as necessary, or combinations can be made as appropriate.

1. Overall Configuration

Figure 1:
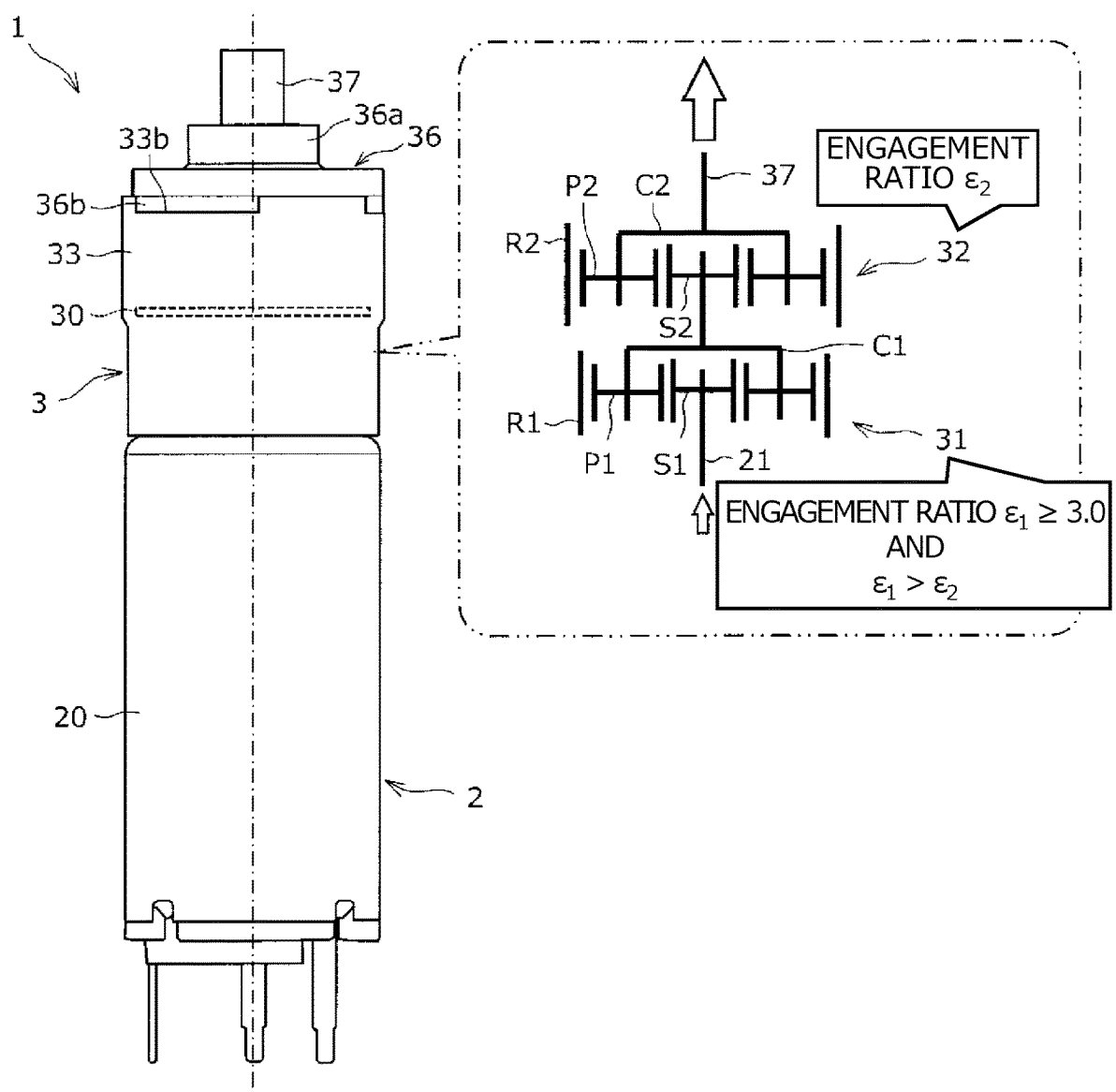
FIG. 1 is a side view showing a geared motor including a reduction gear according to an embodiment, and a skeleton view of planetary gear mechanisms included in the reduction gear.
Figure 2:
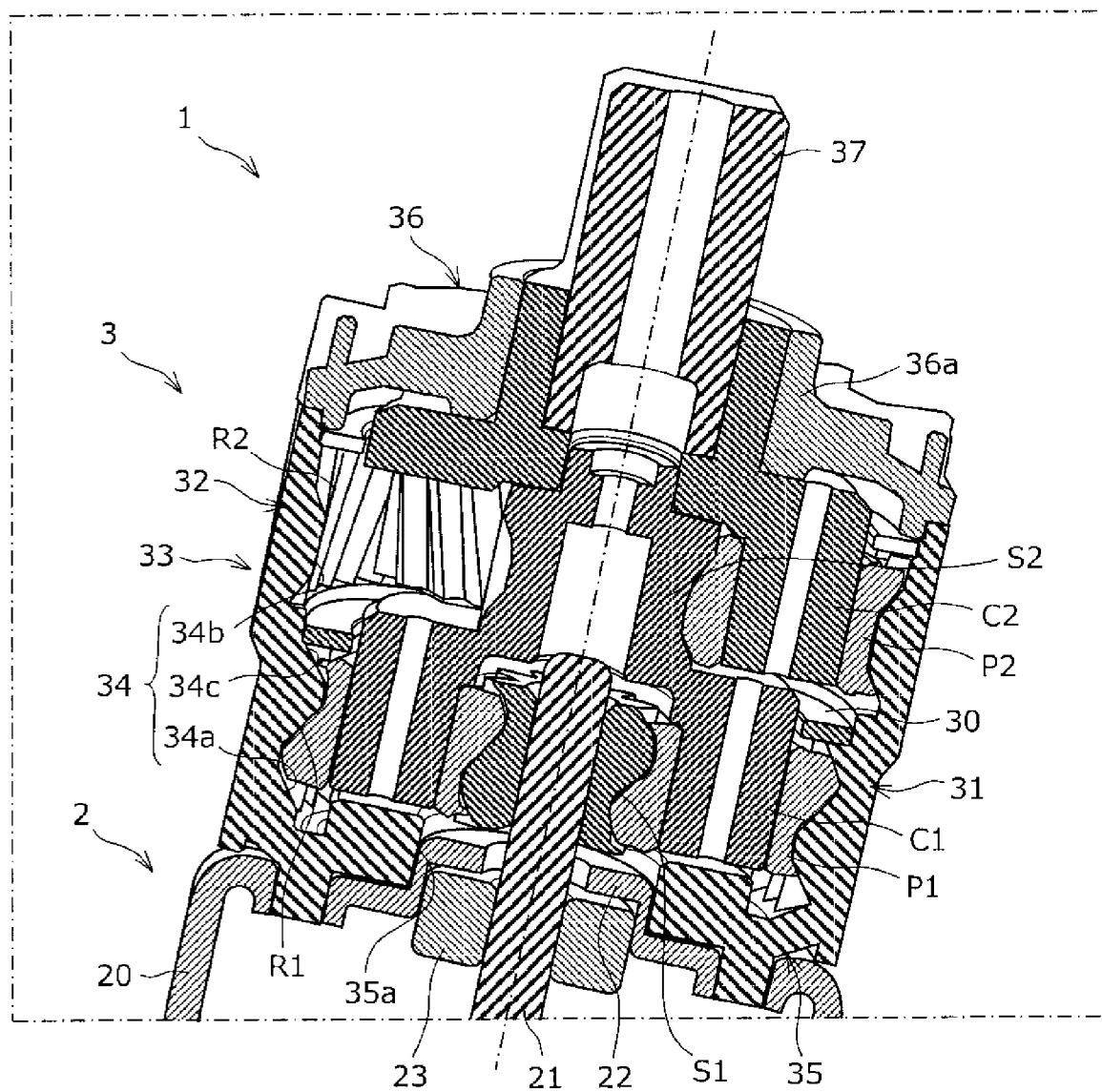
FIG. 2 is a perspective cross-sectional view when the reduction gear of the geared motor in FIG. 1, and a part of a motor are cut in an axial direction, and are viewed obliquely.

As shown in FIG. 1, a geared motor 1 according to the present embodiment includes a motor 2 and a reduction gear 3, and is used, for example, as a power source of an electric gate (power lift gate) of a vehicle. The motor 2 is, for example, a permanent magnet field type DC motor with a brush, and a stator and a rotor (not shown) are incorporated in a bottomed cylindrical housing 20. As shown in FIG. 2, the housing 20 has a projected portion 22 formed to expand in an axial direction on an end surface thereof, and a bearing 23 fixed to an inside of the projected portion 22. A rotation shaft 21 of the motor 2 is protrusively provided from one axial end of the housing 20 to an outside in a state of being rotatably supported by the bearing 23, and rotates integrally with a sun gear S1 described later.

As shown in FIG. 1, a reduction gear 3 decelerates and outputs the rotation of the motor 2 by two-stage planetary gear mechanisms 31, 32 disposed side by side in the axial direction. That is, the reduction gear 3 of the present embodiment is a planetary gear type two-stage reduction gear for a power lift gate. The two planetary gear mechanisms 31, 32 are incorporated in a case 33 made of resin and formed into a cylindrical shape. At least one of a lid portion and a bottom portion is provided at each of both axial ends of the case 33.

Figure 3:
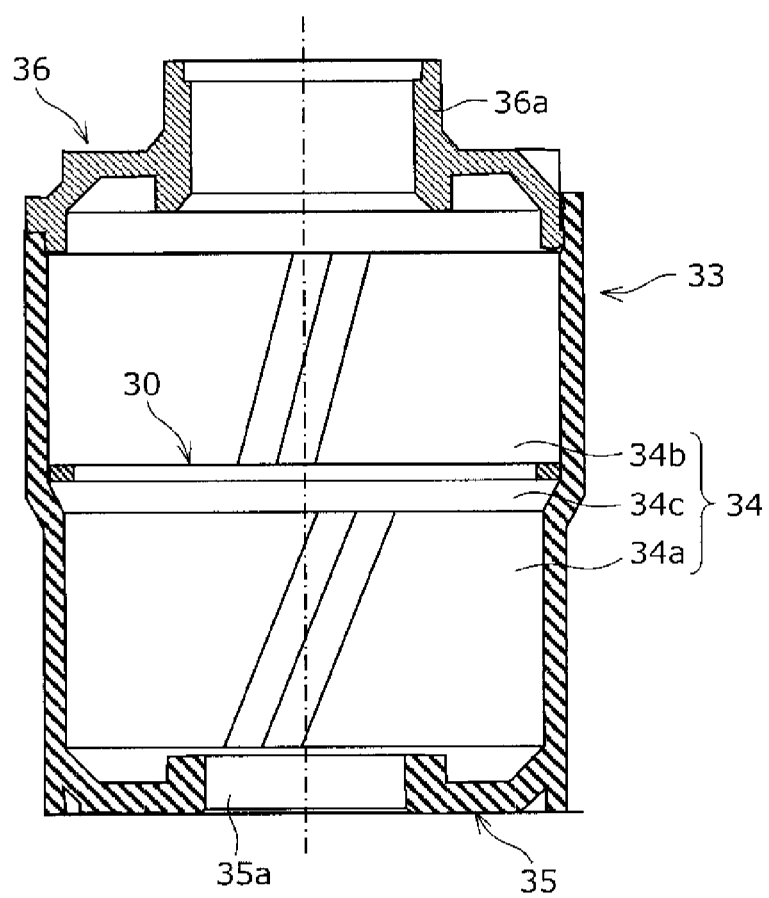
FIG. 3 is an axial cross-sectional view showing a case of the reduction gear in FIG. 1.

As shown in FIGS. 2 and 3, the case 33 of the present embodiment has a tapered bottomed cylindrical shape. That is, at the one axial end of the case 33, a bottom portion 35 is provided, in an opening at another axial end, a lid portion 36 is provided, and in an axial intermediate portion, a tapered inclined portion having a variable outer diameter is provided. The case 33 is attached to the motor 2 such that the bottom portion 35 is located on a motor 2 side and the lid portion 36 is located on an opposite side (output side) of the motor 2. In the present embodiment, a hole portion 35a into which the projected portion 22 of the motor 2 is fitted is provided in a center portion of the bottom portion 35. A cylindrical portion 36a through which a carrier C2 described later is inserted is provided in a center portion of the lid portion 36.

The lid portion 36 of the present embodiment is press-fitted into the opening at the other axial end of the case 33. Note that in the reduction gear 3 of the present embodiment, as shown in FIG. 1, a fan-shaped recessed portion 33b is formed at an edge portion of the case 33 on another axial end side, and at an outer peripheral end portion of the lid portion 36, a rotation preventing portion 36b is provided, the rotation preventing portion 36b being fitted into the recessed portion 33b to thereby disable the lid portion 36 to rotate with respect to the case 33.

Next, the two planetary gear mechanisms 31, 32 will be described. As shown in FIG. 2, each of the planetary gear mechanisms 31, 32 is configured of helical gears. Hereinafter, when the planetary gear mechanism in a first stage (on a high speed side) 31 and the planetary gear mechanism in a second stage (on a low speed side) 32 are distinguished from each other, the former is referred to as a "first planetary gear mechanism 31" and the latter as a "second planetary gear mechanism 32". The second planetary gear mechanism 32 is formed to have a larger diameter than that of the first planetary gear mechanism 31, so that load resistance is enhanced.

As shown in FIGS. 1 and 2, in the first planetary gear mechanism 31, the sun gear S1 is fixed to the rotation shaft 21 of the motor 2, a ring gear R1 is fixed to the case 33, and a carrier C1 joining a pinion gear P1 engaging with both the sun gear S1 and the ring gear R1 is an output element. In the second planetary gear mechanism 32, a sun gear S2 is provided so as to be joined to the carrier C1 of the first planetary gear mechanism 31 and integrally rotate, a ring gear R2 is fixed to the case 33, and the carrier C2 joining a pinion gear P2 engaging with both the sun gear S2 and the ring gear R2 is fixed to an output shaft 37.

Thus, motor output (rotation) input to the sun gear S1 of the first planetary gear mechanism 31 is output from the output shaft 37 rotating integrally with the carrier C2 of the second planetary gear mechanism 32. Note that as shown in FIG. 2, the two ring gears R1, R2 are formed on an inner peripheral surface 34 of the case 33 and are provided integrally with the case 33. Moreover, carrier pins of the carriers C1, C2 are each cantilevered, so that an axial dimension of the case 33 can be reduced.

The inner peripheral surface 34 of the case 33 of the present embodiment includes a small-diameter inner peripheral surface 34a and a large-diameter inner peripheral surface 34b that have different inner diameters from each other in the axial direction, and a tapered surface 34c that connects them and is inclined in the axial direction. The small-diameter inner peripheral surface 34a is located on the motor 2 side, and the large-diameter inner peripheral surface 34b is located on the output side. Each of the small-diameter inner peripheral surface 34a and the large-diameter inner peripheral surface 34b is a cylindrical surface formed with a uniform inner diameter, and the inner diameter of the former is smaller than that of the latter.

In the present embodiment, the small-diameter inner peripheral surface 34a is formed with the ring gear R1 of the first planetary gear mechanism 31, and the large-diameter inner peripheral surface 34b is formed with the ring gear R2 of the second planetary gear mechanism 32. The case 33 in FIG. 3 schematically shows a part of the ring gears R1, R2 formed on the inner peripheral surface 34. As shown in FIG. 3, in the reduction gear 3 of the present embodiment, a torsion angle of the ring gear R1 of the first planetary gear mechanism 31 is larger than a torsion angle of the ring gear R2 of the second planetary gear mechanism 32.

2. Configuration of Main Sections

Next, a configuration for reducing mechanical noise during operation of the motor 2 will be described. The reduction gear 3 of the present embodiment is provided with two types of configurations for noise reduction. A first configuration is to achieve quietness by an engagement ratio of gears, and a second configuration is to suppress vibration by increasing a strength of the case 33. The following will be described in order.

Since the first planetary gear mechanism 31 is located on the motor 2 side, a high-speed and low-load function is required. That is, for the first planetary gear mechanism 31, noise countermeasures are required rather than strength countermeasures. On the other hand, since the second planetary gear mechanism 32 is located on the output side, a low-speed and high-load function is required. That is, for the second planetary gear mechanism 32, strength countermeasures are required rather than noise countermeasures. From these viewpoints, mechanical noise is reduced by increasing an engagement ratio $\varepsilon_1$ of the gears of the first planetary gear mechanism 31, and the strength is increased while reducing an engagement ratio $\varepsilon_2$ by reducing an effective tooth height of the second planetary gear mechanism 32.

In the first planetary gear mechanism 31, at least one of an inner engagement ratio $\varepsilon_{1in}$ of the sun gear S1 and the pinion gear P1, and an outer engagement ratio $\varepsilon_{1out}$ of the pinion gear P1 and the ring gear R1 is set to 3.0 or more, and both the inner engagement ratio $\varepsilon_{1in}$ and the outer engagement ratio $\varepsilon_{1out}$ are set to be larger than the engagement ratio $\varepsilon_2$ (hereinafter, referred to as a "second engagement ratio $\varepsilon_2$") of the second planetary gear mechanism 32. When the two engagement ratios $\varepsilon_{1in}$, $\varepsilon_{1out}$ are not particularly distinguished, they are referred to as a "first engagement ratio $\varepsilon_1$".

The inner engagement ratio $\varepsilon_{1in}$ and the outer engagement ratio $\varepsilon_{1out}$ need not be the same, but both the engagement ratios are preferably 3.0 or more. In the present embodiment, a case where both the inner engagement ratio $\varepsilon_{1in}$ and the outer engagement ratio $\varepsilon_{1out}$ are 3.0 or more is exemplified. That is, as shown in FIG. 1, the following expression is established in the reduction gear 3 of the present embodiment.

The first engagement ratio $\varepsilon_1 \geq 3.0$, and the first engagement ratio $\varepsilon_1 >$ the second engagement ratio $\varepsilon_2$.

As the engagement ratio becomes larger, a load acting on one tooth becomes smaller, and operation sound of the gears is reduced. Here, "the first engagement ratio $\varepsilon_1$ is 3.0 or more." means that when the reduction gear 3 is stopped at an arbitrary timing, two gears (e.g., the sun gear S1 and the pinion gear P1) are always engaged with each other by 3 or 4 teeth. In other words, each of the gears S1, P1, R1 of the first planetary gear mechanism 31 is always engaged with one another by 3 or 4 teeth. Therefore, it is very important that the first engagement ratio $\varepsilon_1$ is 3.0 or more for making the first planetary gear mechanism 31 quiet.

On the other hand, since the rotation of the second planetary gear mechanism 32 is at a low speed and influence on the mechanical noise is small, a tooth profile can be made to increase strength of the teeth by reducing the effective tooth height (resulting in a lower engagement ratio). Thus, by setting the different engagement ratios $\varepsilon_1$ and $\varepsilon_2$ between the first planetary gear mechanism 31 and the second planetary gear mechanism 32, it is possible to secure the functions required for each of them.

While in the present embodiment, by reducing the effective tooth height of each of the gears S2, P2, R2 of the second planetary gear mechanism 32, the second engagement ratio $\varepsilon_2$ is reduced and the strength is increased, the method for reducing the second engagement ratio $\varepsilon_2$ is not limited to this. Similarly, as a method for setting the first engagement ratio $\varepsilon_1$ to 3.0 or more, an engagement pressure angle is made small, the number of teeth is made large, the effective tooth height is made large, and the like are cited. While in the first planetary gear mechanism 31 in which the first engagement ratio $\varepsilon_1$ is 3.0 or more, the strength of each of the gears S1, P1, R1 is lower than each of the gears S2, P2, R2 of the second planetary gear mechanism 32, torque acting on the first planetary gear mechanism 31 is smaller than that of the second planetary gear mechanism 32, so that the strength does not become insufficient.

Next, a configuration in which vibration is suppressed by increasing the strength of the case 33 will be described. As a result of analysis of the mechanical noise of the reduction gear 3, it has been found that an axial central portion of the case 33 vibrates more in comparison with both end portions when the motor 2 is operated. This is because, as shown in FIG. 3, the bottom portion 35 and the lid portion 36 are provided at both the axial ends of the case 33, and have high strengths, while the axial central portion has a lower strength than those at both the end portions and is easily vibrated.

Based on such an analysis result, the reduction gear 3 is provided with a reinforcing component 30 formed of a material having a Young's modulus higher than that of a material of the case 33. As shown in FIGS. 1 and 2, this reinforcing component 30 extends along at least a part of the inner peripheral surface 34 in the axial central portion of the case 33. In this manner, by disposing the reinforcing component 30 having a high strength that supports the axial central portion of the case 33, the strength of the axial central portion is increased, vibration is suppressed, and mechanical noise is reduced.

The material of the reinforcing component 30 only needs to be higher in strength than that of the case 33 (high Young's modulus), and may be, for example, a metal such as iron, aluminum, or copper, or a resin having a higher strength. The reinforcing component 30 may have, for example, a ring shape (e.g., a washer) extending over an entire circumference of the case 33 in the axial central portion of the case 33, or a C shape with a part of a circumference missing. Further, the number of reinforcing components 30 is not limited to one, and a plurality of reinforcing components 30 each having an arc shape may extend at the same axial position with a gap in a circumferential direction therebetween. In the present embodiment, the reinforcing component 30 having a ring shape is exemplified.

As shown in FIG. 2, the reinforcing component 30 of the present embodiment is located between the pinion gears P1, P2 of the two planetary gear mechanisms 31, 32. A relatively wide space in a radial direction is formed between these pinion gears P1, P2 in an internal space of the case 33. Since the strength of the case 33 can be increased as a radial dimension (a half of a difference obtained by subtracting an inner diameter from an outer diameter) of the ring-shaped reinforcing component 30 is larger, disposing the reinforcing component 30 between the pinion gears P1, P2 can further increase the strength of the case 33. Note that the reinforcing component 30 of the present embodiment is disposed outside the carrier C1 of the first planetary gear mechanism 31 in the radial direction with a slight gap therebetween.

Further, the reinforcing component 30 of the present embodiment is press-fitted from the opening on the other end side of the case 33, and as shown in FIG. 3, is disposed at a position in contact with a boundary line between the large-diameter inner peripheral surface 34b and the tapered surface 34c. That is, the reinforcing component 30 is press-fitted up to a position where the inner diameter of the inner peripheral surface 34 changes, and is fixed at this position. Note that the case 33 vibrates most easily at a position where a distance from a surface of the bottom portion 35 facing a case inside, and a distance from an end surface of the lid portion 36 facing the case inside are equal (an axial center position), so that it is preferable that the reinforcing component 30 is disposed at this position.

3. Effects (1) In the above-described reduction gear 3, since at least one of the inner engagement ratio $\varepsilon_{1in}$ and the outer engagement ratio $\varepsilon_{1out}$ of the first planetary gear mechanism 31 rotating at high speed is set to 3.0 or more, the gears can be made quiet and the mechanical noise of the reduction gear 3 can be reduced. Further, since the engagement ratio $\varepsilon_2$ of the second planetary gear mechanism 32 to which large torque is input is set lower than the first engagement ratio $\varepsilon_1$, a strength of the second planetary gear mechanism 32 can be increased. Therefore, the mechanical noise of the reduction gear 3 can be reduced while securing the strength of the gears. Note that in the above-described reduction gear 3, since the mechanical noise is reduced by setting the engagement ratios, an increase in the number of parts can be avoided, and there is little change in material or mold cost. Therefore, the reduction gear 3 described above is also excellent from these viewpoints.

(2) In the above-described reduction gear 3, since both the inner engagement ratio $\varepsilon_{1in}$ and the outer engagement ratio $\varepsilon_{1out}$ are 3.0 or more, mechanical noise can be further reduced.

(3) Since the torsion angle of the ring gear R1 of the first planetary gear mechanism 31 is larger than the torsion angle of the ring gear R2 of the second planetary gear mechanism 32, the engagement ratio $\varepsilon_1$ of the first planetary gear mechanism 31 can be made larger. Further, there are characteristics that as the torsion angle becomes larger, the engagement ratio becomes larger, and a thrust force becomes also larger. On the other hand, according to the above-described reduction gear 3, since the torsion angle of the ring gear R2 of the second planetary gear mechanism 32 on which large torque acts is smaller than the torsion angle of the ring gear R1 of the first planetary gear mechanism 31, the increase of the thrust force can be suppressed.

(4) In the above-described reduction gear 3, the bottom portion 35 of the bottomed cylindrical case 33 is attached to the motor 2 in a direction in which the bottom portion 35 is located on the motor 2 side, and the lid portion 36 is disposed on the output side. Therefore, only by changing a shape of the lid portion 36, specifications of an element (connection object) to be connected to the output side of the reduction gear 3 can be met. In other words, the lid portion 36 having a relatively simple shape can be changed for each connection object, and the case 33 having a relatively complex shape can be used in common for various kinds of connection objects, so that a cost can be reduced.

Moreover, since the second planetary gear mechanism 32 (low speed side) has a larger diameter than the first planetary gear mechanism 31 (high speed side), the inner diameter of the low speed side needs to be larger than the inner diameter of the high speed side when a difference is provided in the inner diameter of the case 33. For this, in the above-described reduction gear 3, since the case 33 is attached to the motor 2 in the direction in which the bottom portion 35 is located on the motor 2 side, the inner diameter of the case 33 on the opening side can be made larger than the inner diameter on the bottom portion 35 side, and a mold can be drawn out at the time of resin molding. Therefore, the case 33 can be formed in a stepped shape, and the case 33 can be downsized.

Further, by attaching the case 33 to the motor 2 with the bottom portion 35 facing the motor 2 side, a fitting portion between the case 33 and the lid portion 36 can be separated from the motor 2 and the first planetary gear mechanism 31. Since the motor 2 and the first planetary gear mechanism 31 are vibration sources that vibrate the reduction gear 3, by separating the fitting portion from the vibration sources, mechanical noise at the fitting portion can be reduced even if a slight gap exists in the fitting between the case 33 and the lid portion 36.

(5) In the above-described reduction gear 3, since the lid portion 36 is press-fitted into the opening of the case 33, the vibration in the opening of the case 33 can be suppressed.

(6) Moreover, in the reduction gear 3 of the present embodiment, the reinforcing component 30 formed of a material having a Young's modulus higher than that of the material of the case 33 extends along at least a part of the inner peripheral surface 34 in the axial central portion of the case 33. Thus, since the strength of the axial central portion, which is most easily vibrated in the case 33, can be increased, the vibration of the case 33 can be suppressed.

Further, if the strength equivalent to the strength of the case 33, which is obtained when the reinforcing component 30 is provided, is obtained by devising a structure of the case made of resin without providing the reinforcing component 30, it is conceivable that a wall thickness of the case is increased or a rib is added. However, since the Young's modulus of the case is lower than that of the reinforcing component 30, in order to secure the strength only by the structure of the case, an increase in size of the case and complication of the shape cannot be avoided.

In response to such a problem, since the above-described reduction gear 3 can achieve high strength with the simple configuration in which the reinforcing component 30 is provided, it is not necessary to increase the wall thickness of the case 33, thereby increasing the size or complicating the shape. Therefore, according to the above-described reduction gear 3, it is possible to reduce mechanical noise by the setting of the engagement ratios, and also reduce mechanical noise while securing a space inside the case 33 and avoiding an increase in size.

(7) When the reinforcing component 30 has a ring shape extending over the entire circumference of the case 33, the axial central portion of the case 33 can be uniformly strengthened highly over the entire circumference, so that mechanical noise can be further reduced.

(8) Further, since the above-described reinforcing component 30 is disposed in the relatively wide space between the pinion gears P1, P2 of the two-stage planetary gear mechanisms 31, 32 inside the case 33, the radial dimension of the reinforcing component 30 can be made large. This can increase the strength of the axial central portion of the case 33, so that mechanical noise can be further reduced.

(9) The above-described case 33 has the small-diameter inner peripheral surface 34a, the large-diameter inner peripheral surface 34b, and the tapered surface 34c connecting these, and the reinforcing component 30 is press-fitted from the opening of the case 33 and disposed at the position in contact with the boundary line between the large-diameter inner peripheral surface 34*b* and the tapered surface 34*c*. Therefore, the use of the reduction gear 3 can prevent the position of the reinforcing component 30 from being deviated, and the reduction of mechanical noise can be continuously achieved. Note that forming the portion where the inner diameter of the case 33 differs as a tapered shape (inclined plane) can facilitate molding of the case 33.

(10) According to the geared motor 1 including the above-described reduction gear 3, quietness can be improved without increasing the size.

4. Others

The above-described geared motor 1 and reduction gear 3 are examples, and the present disclosure is not limited to those described above. Although the above embodiment exemplifies the case in which both the inner engagement ratio $\varepsilon_{1in}$ and the outer engagement ratio $\varepsilon_{1out}$ are 3.0 or more, one of the inner engagement ratio $\varepsilon_{1in}$ and the outer engagement ratio $\varepsilon_{1out}$ may be 3.0 or more, and the other may be less than 3.0. Even in this case, both the inner engagement ratio cull and the outer engagement ratio $\varepsilon_{1out}$ are made larger than the second engagement ratio $\varepsilon_2$. A method for setting the engagement ratios to predetermined values is not particularly limited, and a plurality of parameters used for gear design may be tuned.

The configurations of the two-stage planetary gear mechanisms 31, 32 are not limited to those described above. For example, the torsion angles of the two ring gears R1, R2 may be the same. In this case, the case can be easily molded. Moreover, the ring gears R1, R2 are not formed integrally on the inner peripheral surface 34 of the case 33, but may be retrofitted. The types of input elements (sun gears), output elements (carriers), and fixed elements (ring gears) are not limited to those described above.

The configuration of the above-described reinforcing component 30 is also an example, and for example, the reinforcing component 30 may be insert-molded instead of being press-fitted into the case 33. That is, the reinforcing component 30 may be provided so as to be exposed inside the case, may be embedded in the case, or may be provided outside the case. Moreover, the position of the reinforcing component 30 is not limited to between the pinion gears P1, P2 of the planetary gear mechanisms 31, 32, and may be a position overlapping with either one of the planetary gear mechanisms 31, 32 (e.g., a position where it overlaps the ring gear R1 or R2). At least, by disposing the reinforcing component in the axial central portion of the case, the same effects as in the above-described embodiment can be obtained.

The shape of the case 33 is not limited to the tapered bottomed cylindrical shape described above. For example, instead of the taper, it may be a stepped cylindrical shape, or may be a cylindrical shape in which the outer diameter of the case is constant in the axial direction. In the case of the stepped cylindrical case, the position of the reinforcing component can be stabilized by disposing (e.g., press-fitting) the reinforcing component in a stepped portion. Note that the thickness (wall thickness) of the case may not be constant in the axial direction. That is, the inner peripheral surface may be provided with a taper or a step, and the outer peripheral surface may have a constant outer diameter. Further, openings may be provided at both the axial ends of the case, and lid portions may be attached to these openings. An attachment direction of the case to the motor 2 may be opposite to the foregoing.

Note that application of the above-described geared motor 1 is not limited to a driving source of the electric gate of the vehicle, but may be applied to driving sources of various electric devices.

What is claimed is:

1. A reduction gear configured to decelerate and output rotation of a motor, the reduction gear comprising:
   two-stage planetary gear mechanisms that are provided side by side in an axial direction of the motor and are each configured of helical gears; and
   a case made of resin and formed into a cylindrical shape, the case incorporating the two-stage planetary gear mechanisms,
   wherein at least one of an inner engagement ratio of a sun gear and a pinion gear of the planetary gear mechanism in a first stage and an outer engagement ratio of the pinion gear and a ring gear of the planetary gear mechanism in the first stage is 3.0 or more, and both the inner engagement ratio and the outer engagement ratio are larger than an engagement ratio of the planetary gear mechanism in a second stage.

2. The reduction gear according to claim 1, wherein both the inner engagement ratio and the outer engagement ratio are 3.0 or more.

3. The reduction gear according to claim 2, wherein a torsion angle of the ring gear of the planetary gear mechanism in the first stage is larger than a torsion angle of a ring gear of the planetary gear mechanism in the second stage.

4. The reduction gear according to claim 2, wherein the case has a bottomed cylindrical shape having a bottom portion at one axial end and a lid portion at another axial end, and is attached to the motor in a direction in which the bottom portion is located on a motor side.

5. The reduction gear according to claim 1, wherein a torsion angle of the ring gear of the planetary gear mechanism in the first stage is larger than a torsion angle of a ring gear of the planetary gear mechanism in the second stage.

6. The reduction gear according to claim 1, wherein the case has a bottomed cylindrical shape having a bottom portion at one axial end and a lid portion at another axial end, and is attached to the motor in a direction in which the bottom portion is located on a motor side.

7. The reduction gear according to claim 6, wherein the lid portion is press-fitted into an opening at the other axial end of the case.

8. The reduction gear according to claim 5, wherein the case has a bottomed cylindrical shape having a bottom portion at one axial end and a lid portion at another axial end, and is attached to the motor in a direction in which the bottom portion is located on a motor side.

9. A geared motor comprising:
   a reduction gear configured to decelerate and output rotation of a motor, the reduction gear comprising:
   two-stage planetary gear mechanisms that are provided side by side in an axial direction of the motor and are each configured of helical gears; and
   a case made of resin and formed into a cylindrical shape, the case incorporating the two-stage planetary gear mechanisms,
   wherein at least one of an inner engagement ratio of a sun gear and a pinion gear of the planetary gear mechanism in a first stage and an outer engagement ratio of the pinion gear and a ring gear of the planetary gear mechanism in the first stage is 3.0 or more, and both the inner engagement ratio and the outer engagement ratio are larger than an engagement ratio of the planetary gear mechanism in a second stage; and the motor having a shaft integrally rotating with the sun gear of the planetary gear mechanism in the first stage of the reduction gear.

10. The geared motor according to claim 9, wherein both the inner engagement ratio and the outer engagement ratio are 3.0 or more.

11. The geared motor according to claim 9, wherein a torsion angle of the ring gear of the planetary gear mechanism in the first stage is larger than a torsion angle of a ring gear of the planetary gear mechanism in the second stage.

12. The geared motor according to claim 9, wherein the case has a bottomed cylindrical shape having a bottom portion at one axial end and a lid portion at another axial end, and is attached to the motor in a direction in which the bottom portion is located on a motor side.

13. The geared motor according to claim 12, wherein the lid portion is press-fitted into an opening at the other axial end of the case.

\* \* \* \* \*